Patented Dec. 16, 1930

1,785,508

UNITED STATES PATENT OFFICE

ELIAS R. WILNER, OF NEW YORK, N. Y., ASSIGNOR TO EDDYSTONE CEMENT CORPORATION, OF NEW YORK, N. Y.

METHOD FOR PRODUCING CEMENT

No Drawing. Application filed July 28, 1928. Serial No. 296,097.

This invention relates to a new hydraulic cement and the process for producing the same, and has for its principal object the production of such a cement at a lower cost than has been heretofore possible, with a lower specific gravity, which is advantageous when weight is a consideration.

As is well known, in the processes heretofore in use, a high fusing heat has been required in connection with the treatment to produce the usual Portland cement clinkers, but by my process a great saving and economy is effected by eliminating these high heats and employing much lower temperatures.

Of the greatest importance as an improvement over heretofore known processes, this product is waterproof, water tight and air tight, and resistant to the action of sea water, acids, fumes, gases and all liquids. It is also more elastic, which is advantageous where contraction and expansion must be considered, and more plastic and therefore can be poured more readily when used in concrete construction.

This deficiency of non-resistance in Portland cement has been principally the result of the presence of a relatively large proportion of free lime CaO which can only be absorbed in actual production by a chemical union with other chemical substances, which are capable of such chemical union.

It has been found by experimentation that the most efficient and economical of such substances for use in the production of cements is silica ($SiO_2$). This mineral salt is common to many earths, but with few exceptions, it is found in a dormant, inactive chemical state which prevents its uniting chemically with the lime to a sufficient degree unless the silica ($SiO_2$) is treated and made susceptible to the desired chemical union, and this said treatment is another of the objects of this invention. In this new cement the same ingredients are used as in the former processes of producing Portland cement, that is lime, clay or shale, no other chemicals being used, but these ingredients are so treated by this process as to convert a sufficient quantity of silica ($SiO_2$) into its chemical active state, which will enable it to chemically unite with the unabsorbed lime. The above named minerals, lime, clay or shale are separately heated to a relatively much lower degree than that employed in producing the Portland cement clinkers, which require a high fusing heat. These ingredients after being thus heated are mixed in a proportion depending upon immediate conditions, arrived at by a chemical analysis of the two minerals, and then ground in a suitable mill to a fineness at which the chemical union of the lime and silica ($SiO_2$) will take place, this fineness varying in accordance with conditions.

After this ground material leaves the mill, a fixed quantity of water or water steam is introduced and the mixture agitated by suitable mechanical means. Here again the quantity of the water or steam depends upon immediate conditions and a chemical analysis of the raw materials used.

This intimate mixture under the action of the water or steam, aided by the resulting heat, acts to liberate a large proportion of chemically active silica ($SiO_2$) which is capable of the chemical union with the unabsorbed lime. The resulting product will have all the qualities of Portland cement, and may be used independently in constructions of every description in combination with sand and other materials.

As an example, to produce the above described cement we take 77½% of clay, shale or other silicious earths and heat it separately to 800° Celsius. To this is added 22½% of lime, which has been heated separately to a temperature sufficient to drive off all the $CO_2$ gases which, depending upon different limes, will vary between one thousand and twelve hundred and fifty degrees Celsius. The two ingredients are now mixed together, ground to a fineness of 80 per cent on 200 mesh sieve, and then agitated with the addition of 8% of water or its equivalent in steam. Gypsum in small quantities (2 to 4%) may be added, if desired, to retard the quick setting of the cement.

The above proportions, temperatures and fineness will vary in each case, depending upon the chemical composition of the raw materials used.

The resulting cement will have a twenty to twenty-five per cent lime content, compared with sixty-two to sixty-seven per cent found in existing cements. This smaller lime content will assure the elimination of free lime, which is the important factor in the deterioration of concrete.

The cement can be cheaply produced and will have a much lighter specific gravity. A litre of it loosely packed will weigh six hundred grams, against eleven hundred grams of existing cements. This greater volume will enable one to build denser concrete at a much lower cost than can be done with existing cements.

After hardening, the above described combination of the chemically active silica ($SiO_2$) and the unabsorbed lime will be converted into an insoluble double salt, Tri-calcium silicate ($3CaO.SiO_2$), and it will also be found that the lime is present in a very small quantity, and eventually entirely absorbed having been replaced by this double salt.

This product also may be advantageously combined with Portland cement clinkers and then ground together, the resulting cement besides retaining all the Portland cement characteristics, having the resisting qualities to sea water, acids, fumes, and other liquids of waterproofness, watertightness and airtightness, and elasticity and plasticity.

I claim:

1. The method of producing cement consisting in separately heating lime and clay, shale or other silicious earths to a relatively low point, mixing the heated lime and clay, shale or other silicious earths, grinding the said mixture to a suitable fineness, and introducing a jet of water or steam into the mixture under agitation.

2. The method of producing cement consisting in separately heating lime and clay, shale or other silicious earths to a relatively low point, mixing the heated lime and clay, shale or other silicious earths, grinding the said mixture to a suitable fineness, and introducing a jet of water or steam into the mixture under agitation, to convert the silica therein to a chemically active state enabling it to unite chemically with the unabsorbed lime.

In testimony whereof I have hereunto affixed my signature.

ELIAS R. WILNER.